United States Patent
Chandrasekhar

(10) Patent No.: US 9,053,191 B2
(45) Date of Patent: Jun. 9, 2015

(54) RETROACTIVE SEARCH OF OBJECTS USING K-D TREE

(75) Inventor: Vikram Chandrasekhar, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 344 days.

(21) Appl. No.: 13/599,162

(22) Filed: Aug. 30, 2012

(65) Prior Publication Data

US 2014/0067806 A1    Mar. 6, 2014

(51) Int. Cl.
G06F 7/00      (2006.01)
G06F 17/30     (2006.01)

(52) U.S. Cl.
CPC ................ G06F 17/30867 (2013.01)

(58) Field of Classification Search
CPC ............ G06F 17/30327; G06F 17/30625; G06F 17/30961; G06F 17/30796; G06F 17/18; G06F 17/30333; G06F 17/3028; G06F 17/30241; G06K 9/0063; Y10S 707/99936
USPC ................................. 707/741, 779
See application file for complete search history.

(56) References Cited

U.S. PATENT DOCUMENTS

| | | | |
|---|---|---|---|
| 6,026,189 A * | 2/2000 | Greenspan | 382/226 |
| 6,256,712 B1 | 7/2001 | Challenger | |
| 2003/0187867 A1 | 10/2003 | Smartt | |
| 2008/0074419 A1 * | 3/2008 | Museth et al. | 345/420 |
| 2008/0192051 A1 | 8/2008 | Fowler | |
| 2010/0100548 A1 * | 4/2010 | Scott et al. | 707/741 |
| 2010/0138449 A1 | 6/2010 | Williamson | |
| 2010/0205181 A1 * | 8/2010 | Chidlovskii | 707/741 |
| 2010/0235208 A1 | 9/2010 | Valensi | |
| 2011/0158533 A1 * | 6/2011 | Gutelzon et al. | 382/176 |
| 2011/0202571 A1 | 8/2011 | Yan | |
| 2012/0304125 A1 * | 11/2012 | Gokturk et al. | 715/825 |
| 2012/0330967 A1 * | 12/2012 | Vaddadi et al. | 707/743 |
| 2013/0207976 A1 * | 8/2013 | Jenkins | 345/420 |

OTHER PUBLICATIONS

U.S. Appl. No. 13/599,012, filed Aug. 30, 2012, Chandrasekhar.
Supplemental Response to Non-Final Rejection for U.S. Appl. No. 13/599,012, Dec. 9, 2014.
Response to Non-Final Rejection for U.S. Appl. No. 13/599,012, Dec. 9, 2014.
Non-Final Rejection for U.S. Appl. No. 13/599,012, Sep. 26, 2014.

* cited by examiner

*Primary Examiner* — Mariela Reyes
*Assistant Examiner* — Linh Black
(74) *Attorney, Agent, or Firm* — Baker Botts L.L.P.

(57) ABSTRACT

In one embodiment, a method includes at time $t_2$, determining a delta set of first objects representing a difference between a first set of first objects at time $t_1$ and a second set of first objects at time $t_2$; comparing the delta set of first objects with a set of second objects represented as a balanced k-dimensional tree; and identifying each second object whose content substantially matches content of at least one first object from the delta set of first objects.

9 Claims, 5 Drawing Sheets

RETROACTIVE SEARCH OF OBJECTS USING *K*-D TREE

TECHNICAL FIELD

This disclosure generally relates to retroactively searching for objects having specific contents.

BACKGROUND

In computer science, a k-dimensional tree, or k-d tree for short, is a space-partitioning data structure for organizing data points in a k-dimensional space. k-d trees are a useful data structure for many applications, such as searches involving a multidimensional search key.

SUMMARY OF PARTICULAR EMBODIMENTS

In particular embodiments, a social-networking system may receive data objects from its users and store these data objects in the system. For example, a data object may be an image, which a user uploads to the social-networking system. Sometimes, the social-networking system may identify data objects having specific types of contents. For example, for policy reasons, the social-networking system may identify images having pornographic, hateful, racist, dangerous, violent, or offensive contents so that such undesirable or unsuitable images are not freely shared among its users.

In particular embodiments, the social-networking system may maintain a list of data objects having specific types of contents. For example, the social-networking system may maintain a blacklist of images having undesirable or unsuitable contents. This blacklist of images may be updated as needed. New images with undesirable or unsuitable contents may be added to the blacklist as they become known to the social-networking system. Some images on the blacklist may be deleted (e.g., very old images).

In particular embodiments, the social-networking system may periodically conduct a retroactive search among those data objects already in the system to identify all the objects having specific types of contents. For example, since new images may be added to the blacklist or existing images may be deleted from the blacklist, the social-networking system may periodically search through all the images in the system to identify those images having undesirable contents based on the current blacklist of images. To do so, in particular embodiments, a delta blacklist of images may be constructed, which may include only the difference between the two versions of the blacklist (e.g., new images added to the blacklist between the current time and the previous time when the last such search was performed). The images on the delta blacklist are then compared to all the images currently in the system. Images in the system whose contents substantially match the content of at least one image on the delta blacklist may be identified.

In particular embodiments, to improve performance of the search process, the images in the social-networking system are stored in one or more k-dimensional trees (k-d tree for short). More specifically, each k-d tree is balanced. Each image on the delta blacklist is compared against each k-d tree to identify those images in the system whose content substantially match the content of the image on the delta blacklist.

DESCRIPTION OF EXAMPLE EMBODIMENTS

In particular embodiments, a system, such as a social-networking system, may conduct periodic searches to identify data objects stored in the system that have specific types of contents. For example, the social-networking system may receive data objects, such as images, videos, or texts, from its users and store these data objects in the system. However, for various policy reasons, some of these data objects may have contents that are considered undesirable or unsuitable to the social-networking system. For example, some images may have pornographic (especially child pornography), hateful, racist, dangerous, violent, or offensive contents. The social-networking system may periodically search through all the images stored therein to identify images with such undesirable or unsuitable contents so that appropriate actions may be taken with respect to these images.

Figure 1:
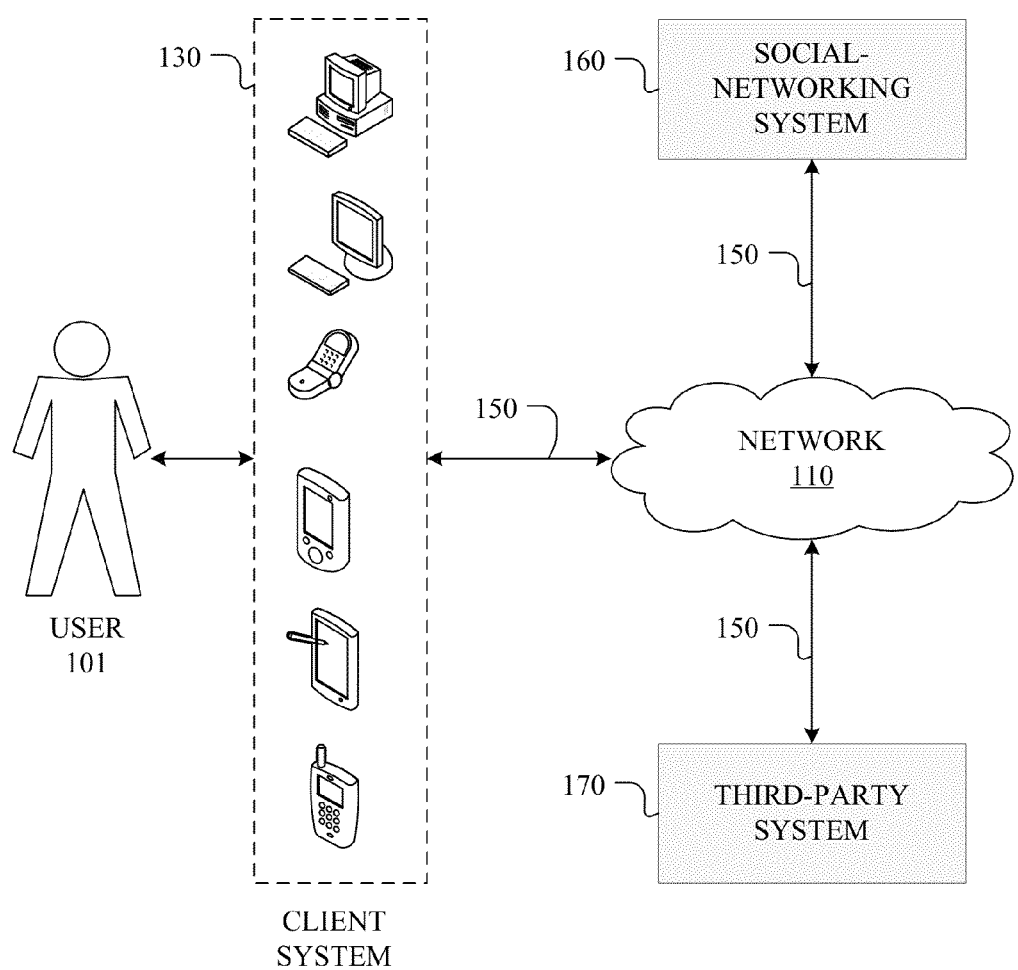
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various functions. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social-networking system 160 may store various types of data. In particular embodiments, such data may be stored in a graph having any number of nodes and edges, where each edge connects two nodes. The graph is often referred to as a "social graph" as it contains, among others, social information.

Figure 2:
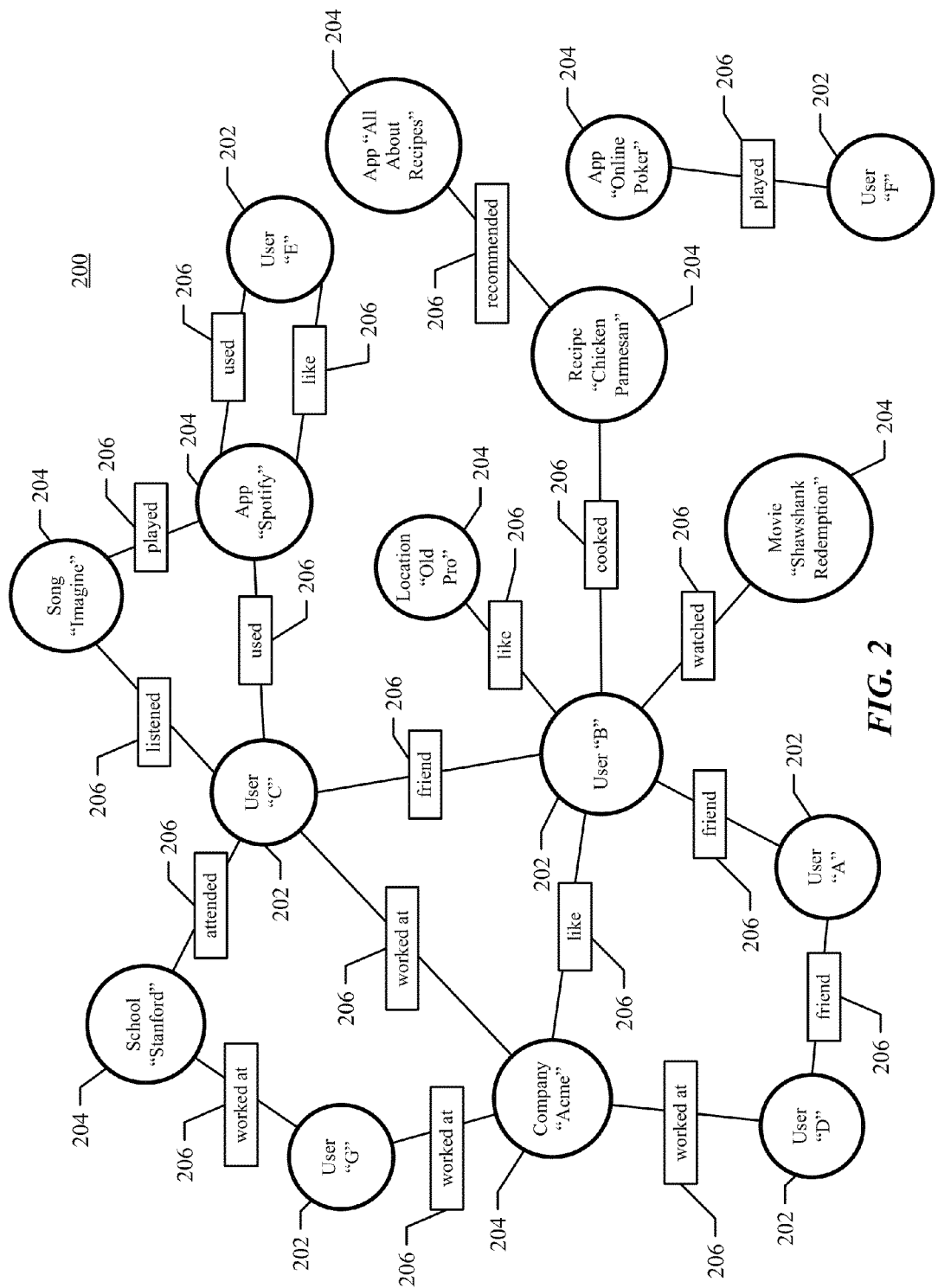
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Users 101 of social-networking system 160 may upload data objects, such as images, videos, or texts, to social-networking system 160 to be stored therein. Each data object may be represented by a specific node in social graph 200. Furthermore, an edge may connect the node representing the data object and the node representing the user uploading the data object.

In particular embodiments, when a data object is uploaded to social-networking system 160, social-networking system 160 may verify the content of the data object to ensure that it does not contain undesirable or unsuitable content. For example, when an image is uploaded to social-networking system 160, social-networking system 160 may verify that this image does not have pornographic, hateful, racist, dangerous, violent, or offensive content. In this case, social-networking system 160 may maintain a blacklist of known images having undesirable or unsuitable contents. When an image is uploaded to social-networking system 160, the content of this image is compared to the contents of the images on the blacklist. If the content of this image substantially matches the content of any images on the blacklist, social-networking system 160 may take appropriate actions with respect to this image (e.g., block this image).

Of course, the images on the blacklist are not necessarily undesirable images always. In fact, in particular embodiments, the images on the blacklist may be divided into categories. Alternatively, a separate list may be created for each category of images. One category may include pornographic images. Another category may include violent images. However, a third category may include images of world-famous monuments, while a fourth category may include images of celebrities. In this sense, the images on the blacklist are those having specific types of contents of particular interest to, for example, social-networking system 160. By comparing images with images on the blacklist, images having specific types of contents may be identifies. With some implementations, social-networking system 160 may maintain a blacklist of images as well as a whitelist of images. In this case, the images on the blacklist may have undesirable contents, and the images on the whitelist do not necessarily have undesirable contents but may have certain types of contents of particular interests to social-networking system 160 or its users. Either list may be used to identify images in the system having various types of contents.

In particular embodiments, when comparing images with images on the blacklist, only a specific category or categories of images on the blacklist may be used. For example, if the purpose is to locate undesirable images in social-networking system 160, the system may only compare images against those images on the blacklist that belong to categories such as pornographic, racist, and violent images. On the other hand, if the purpose is to locate all the images of sport celebrities, the system may only compare images against those images on the blacklist that belong to the sport celebrity category. This way, images having a specific type of content may be identified by comparing images with the appropriate categories of images on the blacklist.

In particular embodiments, an image-matching algorithm may be used to compare two images. Some image-matching algorithms are capable of performing a fuzzy, instead of exact, match between two images. Examples of such image-matching algorithms include, but not limited to, Discrete Wavelet Transform (DWT) based image hash, hashing via Singular value Decomposition (SVD), and feature point based image hashing. With particular implementations, an image-matching technology called PhotoDNA developed by Microsoft Inc. may be employed to compare the contents of two specific images. Briefly, given an image (e.g., a JPEG file of a digital photograph), PhotoDNA generates a 144-element vector (i.e., a vector having 144 elements) representing the content of the image. Each element in the vector is 1 byte. This set of 144 elements (i.e., the 144-element vector) is also referred to as the "hash" of the image. Since these elements represent the content of an image, they are essentially the "fingerprint" of the image. To compare the contents of two specific images, image X and image Y, a set of 144 elements, $x_1 \ldots x_{144}$, is generated for image X, and a set of 144 elements, $y_1 \ldots y_{144}$, is generated for image Y. The proximity measurement between image X and image Y may then be computed as $$\sum_{i=1}^{144}(x_i-y_i)^2.$$

The contents of image X and image Y are considered substantially the same (i.e., matching) if the proximity measurement between image X and image Y is less than a predefined threshold.

The advantage of some image-matching algorithms (e.g., PhotoDNA) is that the technology performs a fuzzy match, instead of an exact match, of the contents of two images. In other words, it is not necessary for the two images to have exactly the same content in order for such an image-matching algorithm to find a match. Instead, even when there are slight variations between the two images (e.g., one image is slightly cropped from the other image, one image is slightly larger than the other image, or one image has an extra element not found in the other image), the image-matching algorithm can still find a match if the variations are sufficiently minor. How much variation can be tolerated is controlled by the threshold value. The larger the threshold value, the more variation tolerance, and vice versa.

Using a suitable image-matching algorithm (e.g., PhotoDNA), a set of elements (i.e., the hash) is generated for each image on the blacklist maintained by social-networking system 160. Then, when an image is uploaded to social-networking system 160, a set of elements (i.e., the hash) is also generated for this image. This image is then compared with each image on the blacklist by computing the proximity measurement between this image and each image on the blacklist using their respective sets of elements. If the proximity measurement between this image and an image on the blacklist is sufficiently small (i.e., less than a predefined threshold value), then the content of this image is considered to substantially match the content of that image on the blacklist.

In particular embodiments, social-networking system 160 may update the blacklist of images from time to time. For example, as additional images with undesirable or unsuitable contents become known to social-networking system 160 (e.g., through user reporting), these images may be added to the blacklist. Thus, the blacklist of images may expand as time passes.

For example, suppose that at time $t_1$, the blacklist contains 1000 images. An image, image X, uploaded to social-networking system 160 at this time is compared to these 1000 images to verify whether it contains undesirable content (e.g., whether the content of image X substantially matches the content of any of the 1000 images currently on the blacklist). Further suppose that no match is found. Image X is then stored in social-networking system 160. At time $t_2$ (some time after time $t_1$), new undesirable images have become known to social-networking system 160 and have been added to the blacklist. Suppose that at time $t_2$, the blacklist now contains 1100 images (i.e., 100 images have been added to the blacklist between time $t_1$ and time $t_2$). Another image, image Y, uploaded to social-networking system 160 at this time is thus compared to these 1100 images to verify whether it contains undesirable content (e.g., whether the content of image Y substantially matches the content of any of the 1100 images currently on the blacklist). However, those images uploaded to social-networking system 160 before time $t_2$ and already stored in the system, including image X, have never been compared to the 100 images newly added to the blacklist between time $t_1$ and time $t_2$ since these 100 images were not on the blacklist when those images already stored in the system were uploaded.

In particular embodiments, social-networking system 160 may conduct periodic retroactive searches among all the images stored in the system to ensure that the images stored in the system are compared against the current blacklist of images. For example, the search may be conducted once every 8 hours, once a day, or once a week. How often the search needs to be conduced may depend on how frequently images are uploaded to the system or added to the blacklist.

Figure 3:
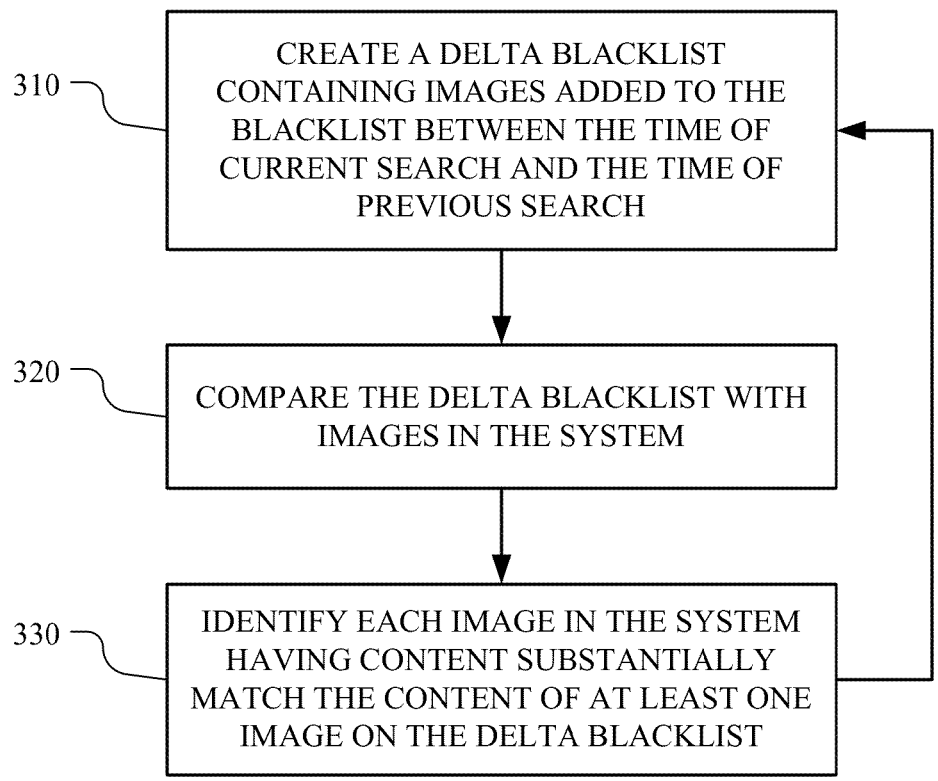
FIG. 3 illustrates an example method for conducting a retroactive search among images stored in a system to identify images having specific types of contents.

FIG. 3 illustrates an example method 300 for conducting a retroactive search. Suppose that the search is conducted periodically at times $t_1$, $t_2$, $t_3$, and so on. In this case, for example, at time $t_1$, the images in the system are compared against the blacklist of images currently available at time $t_1$ (e.g., 1000 images). At time $t_2$, suppose that the blacklist now contains 1100 images, with 100 images added to the blacklist between time $t_1$ and time $t_2$. However, among these 1100 images on the blacklist, the images in the system have already been compared to the 1000 images on the blacklist during the previous search at time $t_1$. Only those 100 images newly added to the blacklist between time $t_1$ and time $t_2$ have not been verified during the previous search at time $t_1$. Thus, during the search performed at time $t_2$, it is not necessary to compare the images in the system with all 1100 images currently on the blacklist. Instead, the images in the system only need to be compared with the 100 images recently added to the blacklist between time $t_1$ and time $t_2$. Similarly, at time $t_3$, suppose that the blacklist now contains 1250 images, with 150 images added to the blacklist between time $t_2$ and time $t_3$. Again, the images in the system have already been compared to the 1100 images during the previous searches at time $t_1$ and time $t_2$. Only the 150 images newly added to the blacklist between time $t_2$ and time $t_3$ have not been verified. Thus, during the search performed at time $t_3$, the images in the system only need to be compared with the 150 images recently added to the blacklist between time $t_2$ and time $t_3$. In other words, the search only needs to be performed incrementally each time.

In particular embodiments, the steps illustrated in FIG. 3 may be repeated each time a retroactive search is conducted. During each search, at STEP 310, a delta blacklist may be constructed that represents the difference between the version of the blacklist at the time of the current search and the time when the immediately previous search was conducted (e.g., the delta blacklist may contain the images added to the blacklist between the time of the current search and the time when the immediately previous search was conducted). For example, suppose that the current search is conducted at time $t_2$ and the immediately previous search was conducted at time $t_1$. At time $t_1$, the blacklist contains 1000 images. Between time $t_1$ and time $t_2$, 100 images have been added to the blacklist so that at time $t_2$, the blacklist contains 1100 images. In this case, the delta blacklist would contain the 100 images added to the blacklist between time $t_1$ and time $t_2$.

At STEP 320, the delta blacklist is compared with all the images currently stored in, for example, social-networking system 160. As described above, with specific implementations, image comparison may be performed using PhotoDNA. A hash is generated for each image on the blacklist as well as for each image stored in social-networking system 160. Image hashing (i.e., generating a set of elements representing the content of an image) may be performed at the time an image is uploaded to social-networking system 160 or added to the blacklist. Instead of or in addition to storing the images themselves, the hashes of the images may be stored. Subsequently, the hashes of the images may be retrieved from memory storage for image comparison whenever needed (e.g., computing the proximity measurements between an image on the delta blacklist and an image in the system).

At STEP 330, each image stored in social-networking system 160 whose content substantially matches the content of at least one image on the delta blacklist is identified. Again, with specific implementations, to compare an image stored in social-networking system 160 with an image on the delta blacklist, the proximity measurement between these two images may be computed using their respective hashes. If the proximity measurement is less than a predefined threshold, then the content of the image stored in social-networking system 160 is considered to substantially match that of the image on the delta blacklist. Social-networking system 160 may then take appropriate actions with respect to such an image (e.g., removing the image from social-networking system 160).

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In practice, there may be millions or even billions of images stored in a system, such as social-networking system 160. To perform a complete search of such a great number of images can take a very long time. To improve performance, in particular embodiments, the images stored in social-networking system 160 may be stored in one or more k-d trees, and more specifically, balanced k-d trees. Note that well nodes can be added to or deleted from an existing k-d tree, frequent additions or deletions may cause a balanced k-d tree to become imbalanced.

An image-matching algorithm, such as PhotoDNA, is capable of generating a set of 144 elements for an image that represents the content of the image. These 144 elements may be considered the "fingerprint" of the image. In addition, PhotoDNA is also capable of generating a reduced set of 16 elements for an image that represents, for example, the main or key content features of the image (i.e., the reduced "fingerprint" of the image). The set of 16 elements generated for each image may be used to partition a set of images into a k-d tree.

Figure 4:
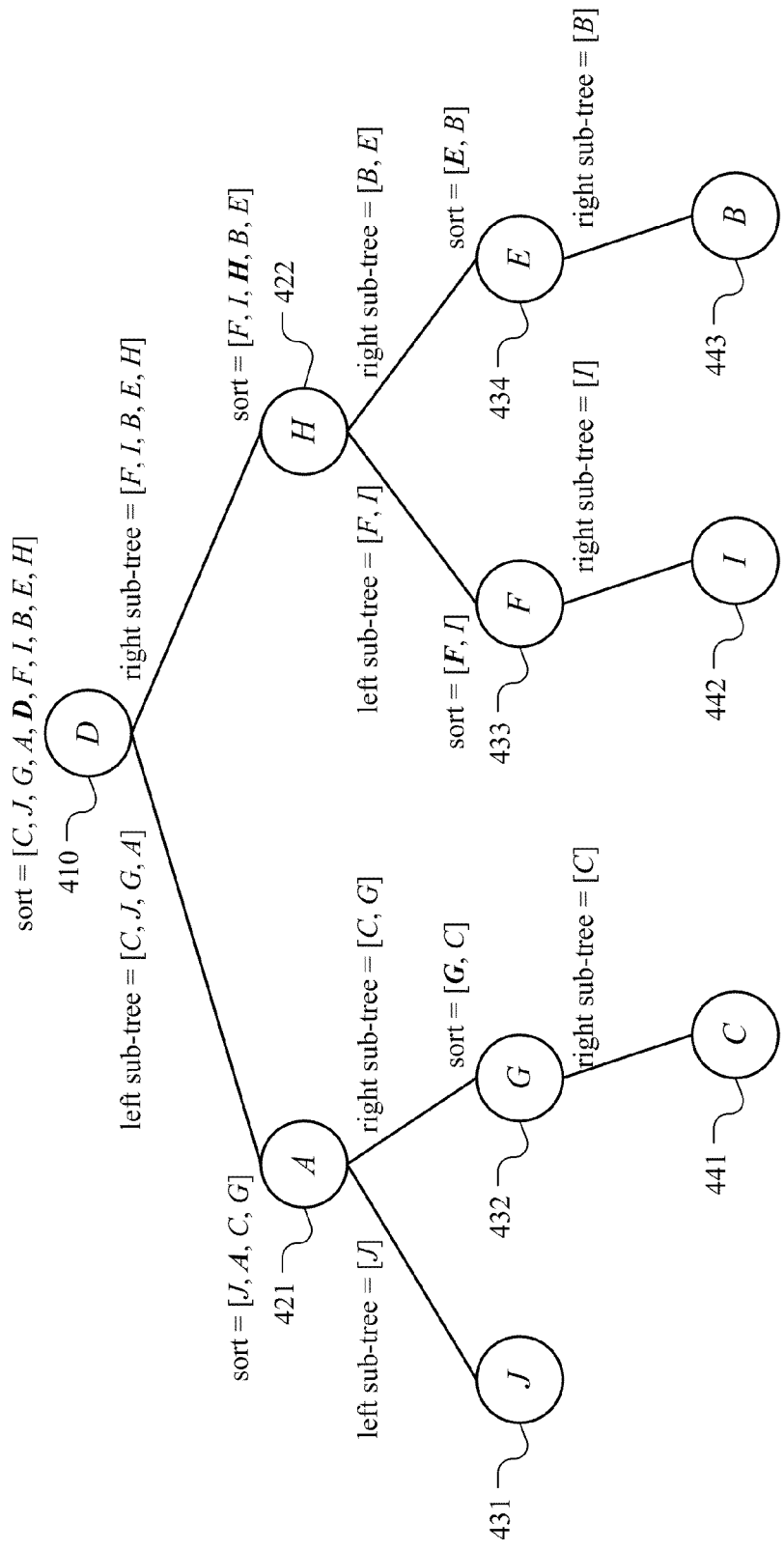
FIG. 4 illustrates an example k-d tree storing 10 images.

To further explain, consider a specific example illustrated in FIG. 4. Suppose that there are 10 images, image A to J, to be partitioned into a k-d tree. Note that a small number of images are used to illustrate the process while simplifying the discussion. In practice, the process may be similarly applied to any number of images.

For image A, PhotoDNA may generate a set of 16 elements, $a_1 \ldots a_{16}$, as well as a set of 144 elements, $a_1 \ldots a_{144}$. For image B, PhotoDNA may generate a set of 16 elements, $b_1 \ldots b_{16}$, as well as a set of 144 elements, $b_1 \ldots b_{144}$. For image C, PhotoDNA may generate a set of 16 elements, $c_1 \ldots c_{16}$, as well as a set of 144 elements, $c_1 \ldots c_{144}$. And so on.

The 10 images may be spatially partitioned into the k-d tree based on their respective sets of 16 elements. At level 1 of the k-d tree, the 10 images are sorted according to their respective first one of the 16 elements (i.e., the first element from each 16-element vector as $a_1, b_1, c_1 \ldots j_1$). Suppose that the 10 images are sorted as C, J, G, A, D, F, I, B, E, H. The image in the middle or the median image, image D, is stored in node 410 at level 1 of the tree. Those images to the left of image D, images C, J, G, and A, are stored in the left sub-tree of node 410, while those images to the right of image D, images F, I, B, E, and H, are stored in the right sub-tree of node 410.

At level 2 of the k-d tree, there are two nodes 421 and 422. For node 421 (i.e., the left child node of node 410), images C, J, G, and A are sorted according to their respective second one of the 16 elements (i.e., the second element from each 16-element vector as $c_2, j_2, g_2, a_2$). Suppose that these 4 images are now sorted as J, A, C, G. The median image, image A, is stored in node 421 at level 2. The image to the left of image A, images J, is stored in the left sub-tree of node 421, while those images to the right of image A, images C and G, are stored in the right sub-tree of node 421. For node 422 (i.e., the right child node of node 410), again, images F, I, B, E, and H are sorted according to their respective second one of the 16 elements (i.e., $f_2, i_2, b_2, e_2, h_2$). Suppose that these 5 images are now sorted as F, I, H, B, E. The image in the middle, image H, is stored in node 422 at level 2. The images to the left of image H, images F and I, are stored in the left sub-tree of node 422, while those images to the right of image H, images B and E, are stored in the right sub-tree of node 422.

At level 3 of the k-d tree, the left sub-tree of node 421 only has one image, image J. Thus, there is no need to sort anymore. Image J is stored in node 431, which is the left child node of node 421.

For node 432, which is the right child node of node 421, images G and C are sorted according to their respective third one of the 16 elements (i.e., the third element from each 16-element vector as $g_3, c_3$). Suppose that these 2 images are now sorted as G, C. The median image, image G, is stored in node 432. There is no image to the left of image G and thus no left sub-tree. The image to the right of image G, image C, is stored in the right sub-tree of node 432.

For node 433, which is the left child node of node 422, images F and I are sorted according to their respective third one of the 16 elements (i.e., $f_3, i_3$). Suppose that these 2 images are now sorted as F, I. The median image, image F, is stored in node 433. There is no image to the left of image F and thus no left sub-tree. The image to the right of image F, image I, is stored in the right sub-tree of node 433.

For node 434, which is the right child node of node 422, images B and E are sorted according to their respective third one of the 16 elements (i.e., $b_3, e_3$). Suppose that these 2 images are now sorted as E, B. The median image, image E, is stored in node 434. There is no image to the left of image E and thus no left sub-tree. The image to the right of image E, image B, is stored in the right sub-tree of node 434.

At level 4 of the k-d tree, node 441 is the right child node of node 432. The right sub-tree of node 432 only has one image, image C. There is no need to sort at this point, and image C is stored in node 441. Similarly, image I is stored in node 442, which is the right child node of node 433, and image B is stored in node 443, which is the right child node of node 434.

To generalize the example illustrated in FIG. 4, a set of images may be partitioned into a k-d tree level by level. For each image in the set, a set of k elements may be generated. Note that although the example illustrated in FIG. 4 uses 16 as a specific value for k, k may be set to any suitable value. At each level i, given a specific node at level i, the sub-set of images belonging to this portion of the tree is sorted according to their respective $i^{th}$ one of the k elements. The median image is then stored in the node. The images to the left of the median image, if any, are stored in the left sub-tree of the node, and the images to the right of the median image, if any, are stored in the right sub-tree of the node.

If the tree has more than k levels, the sorting of the images repeats the cycle of k elements. Thus, at level k+1, the first one of the k elements is used again to sort the images; at level k+2, the second one of the k elements is used again to sort the images; and so on, until all the images in the set are partitioned into the tree. In other words, at each level i, the (i mod k)th element is used to sort the images, when appropriate.

This process ensures that the resulting tree is balanced. In particular embodiments, each image may have a unique identifier. At each node, the identifier, the set of 16 elements, and the set of 144 elements of the corresponding image are stored. With specific implementations, given a specific image, its identifier, the set of 16 elements, and the set of 144 elements may be stored in a block of memory. An index (e.g., a memory reference pointer) may indicate the beginning address of that block of memory. This index may be stored in the corresponding node of the k-d tree.

In practice, social-networking system 160 may have billions of images uploaded by its users. Instead of storing all of these images in one k-d tree, the images may be divided and stored in multiple k-d trees. With some implementations, each k-d tree may be used to store $2^n-1$ images, where n may be some positive integer. The advantage of such implementation is that when comparing the delta blacklist of images with the images in the system during a retroactive search, the comparison may be performed with respect to multiple k-d trees in parallel.

Further more, storing $2^n-1$ images in each k-d tree ensures that the resulting k-d tree is balanced. For example, consider the image partitioning process described above. In the first partitioning step, the set of $2^n-1$ vectors (each vector corresponding to one image and includes k elements representing that image) gets partitioned into two sets of $2^{n-1}-1$ vectors and a median vector. This assures that both sub-trees of the new median node, created out of the median vector, have the same number of nodes. The second partitioning step takes each set of $2^{n-1}-1$ vectors and partitions it into two sets of $2^{n-2}-1$ vectors and a median vector. This process continues until eventually there are 3 vectors that get partitioned into 2 vectors, which become two leaf nodes, and a median vector, which becomes a median node. Thus, each partitioning step guarantees that the resulting sub-trees are of equal sizes. Consequently, the choice of $2^n-1$ as the number of nodes (i.e., corresponding to images) to be stored in each k-d tree results in a perfectly balanced k-d tree. For example, when n=21, $2^{21}-1=2097152-1=2097151$ nodes, or approximately 2 million nodes, are stored in each k-d tree.

For example, suppose that there are n computing devices available for performing the comparison. Once the delta blacklist of images is constructed, each of the n computing devices may obtain a copy of the delta blacklist. Then each of the n computing devices may obtain a copy of a different k-d tree (e.g., by performing a memory copy) and then comparing the blacklist against that copy of the k-d tree. As soon as a computing device finishes processing its copy of the k-d tree, it can obtain a copy of another k-d tree that has not been processed. This may continue until all the k-d trees in the system have been processed (i.e., compared to the delta blacklist).

Conducting search through a k-d tree is faster than a straightforward comparison. For example, suppose that an image, image X (e.g., image X may be on the delta blacklist), is to be compared with the 10 images in the above example (e.g., images A-J may be images stored in a system), which have already been stored in a k-d tree as illustrated in FIG. 4. Without using a k-d tree, image X needs to be compared with each and every one of the 10 images. This requires 10 comparisons (e.g., computing 10 proximity measurements respectively between image X and each of the 10 images). However, using a k-d tree, image X only needs to be compared with some of the 10 images, but not necessarily all of the 10 images. The comparison algorithm traverses the k-d tree down recursively level by level, starting from the root node. At each level, the sub-tree that does not need to be searched is discarded.

With specific implementations, each image on the blacklist may also have its own set of 16 elements and set of 144 elements generated using PhotoDNA. Thus, for image X, PhotoDNA may generate a set of 16 elements, $x_1 \ldots x_{16}$, and a set of 144 elements, $X_1 \ldots x_{144}$.

To further explain the recursive comparison algorithm, consider the specific case of comparing image X with image D. In the example illustrated in FIG. 4, image D is stored in node 410, which is the root node of the k-d tree. First, the proximity measurement between images X and D using their respective sets of 16 elements is computed (e.g., proximity measurement $$1 = \sum_{i=1}^{16} (x_i - d_i)^2).$$

If a potential match is found (e.g., the first proximity measurement computed using the 16 elements is less than a threshold value), then images X and D are compared again using their respective sets of 144 elements (e.g., proximity measurement $$2 = \sum_{i=1}^{144} (x_i - d_i)^2$$

to further confirm the match. This way, whether two images substantially match in content may be determined quickly because in most cases, only the first proximity measurement may need to be computed, and computing the first proximity measurement is faster than computing the second proximity measurement (i.e., 16 elements vs. 144 elements). If the second proximity measurement computed using the 144 elements is also less than the threshold value, this means that a match is found (i.e., the content of image D substantially matches the content of image X). The search of this k-d tree can end at this point (i.e., there is no need to compare image X with the other images also stored in this particular k-d tree), and image D may be identified.

On the other hand, if either the first or the second proximity measurement between images X and D is greater than or equal to the threshold, this means that the content of image D does not match that of image X. The search algorithm decides whether to search the left sub-tree or the right sub-tree of node 410. The element used to sort the images at this level during the construction of the k-d tree is used. Since node 410 is at level 1 of the k-d tree, the first element of the 16 elements should be used. (For level 2, the second element from the 16-element vector should be used. For level 3, the third element from the 16-element vector should be used. And so on.) Each image has a corresponding 16-element vector. For image X, the first element from the set of 16 elements (i.e., the 16-element vector) is $x_1$. For image D, the first element from the set of 16 elements (i.e., the 16-element vector) is $d_1$. Thus, $x_1$ and $d_1$ are compared.

If the square of the difference between $X_1$ and $d_1$, $(x_1-d_1)^2$, is greater than the threshold value, then one of the sub-trees of node 410 (i.e., image D) may be eliminated. In this case, if $x_1 \leq d_1$, then all the nodes in the right sub-tree of node 410, which correspond to images H, F, E, I, and B, will each have a proximity measurement value with image X that is greater than the threshold. For example, image H with the hash $h_1 \ldots h_{16}$ will have a proximity measurement value with image X as $$\sum_{i=1}^{16} (x_i - h_i)^2.$$

Since $h_1 > d_1 \geq x_1$, it means $(x_1-h_1)^2 > (x_1-d_1)$. Hence, the proximity measurement between images H and X will definitely be higher than the threshold, and so there is no need to compare image X with image H. The same reasoning applies to images F, E, I, and B (i.e., all the images in the right sub-tree of node 410). Therefore, the right sub-tree of node 410 (i.e., image D) may be ignored if $x_1 \leq d_1$. Instead, the recursive algorithm proceeds down to the left sub-tree of node 410. In this case, the image to be compared during the next recursive iteration is image A at node 421, which is the left child of node 410.

On the other hand, if $x_1 > d_1$, then all the nodes in the left sub-tree of node 410, which correspond to images A, J, G, and C, will each have a proximity measurement value with image X that is greater than the threshold. For example, image A with the hash $a_1 \ldots a_{16}$ will have a proximity measurement value with image X as $$\sum_{i=1}^{16} (x_i - a_i)^2.$$

Since $a_1 \leq d_1 < x_1$, it means $(x_1-a_1)^2 > (x_1-d_1)^2$. Hence, the proximity measurement between images A and X will definitely be higher than the threshold, and so there is no need to compare image X with image A. Again, the same reasoning applies to images J, G, and C (i.e., all the images in the left sub-tree of node 410). Therefore, the left sub-tree of node 410 (i.e., image D) may be ignored if $x_1 > d_1$. Instead, the recursive algorithm proceeds down to the right sub-tree of node 410. In this case, the image to be compared during the next recursive iteration is image H at node 422, which is the right child of node 410.

If the square of the difference between $x_1$ and $d_1$, $(x_1-d_1)^2$, is less than or equal to the threshold value, then both the left and the right sub-trees of node 410 (i.e., image D) need to be searched. In this case, the recursive algorithm proceeds down to node 421 and compares image X with image A, as well as proceeds down to node 422 and compares image X with image H. With some implementations, the two comparisons may be performed in parallel (e.g., applying appropriate parallel processing or multi-threading techniques).

If the current node (i.e., node 410 in this case) has no child node, the recursion may end. Note that it is possible that the content of image X does not match the content of any image in a k-d tree, in which case no image in the k-d tree is identified.

The process described above with images X and D may be similarly applied during each recursive iteration as the search algorithm traverses down the k-d tree. For example, suppose that during the second iteration, image X is to be compared with image A. The process described above may then be applied to images X and A (i.e., with image A in the place of image D). The recursion may end either when a match is found between image X and an image stored at a particular node in the tree or when a leaf node is reached since a leaf node has no child.

Figure 5:
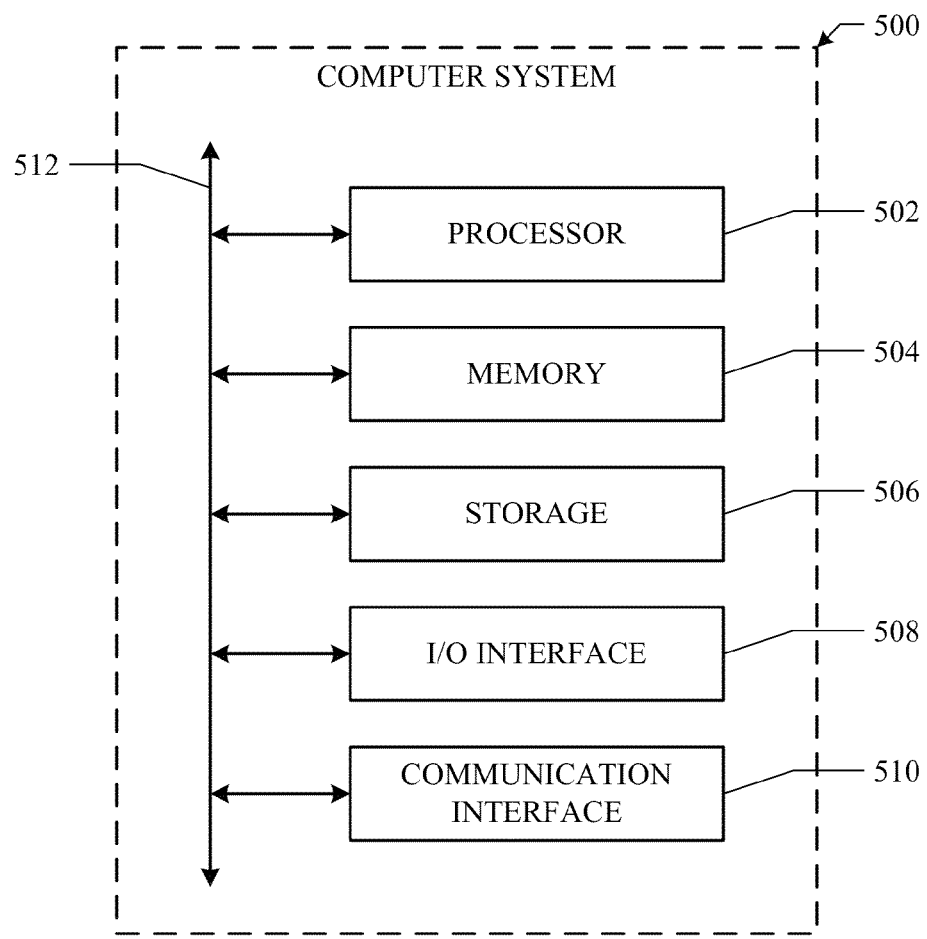
FIG. 5 illustrates an example computer system.

FIG. 5 illustrates an example computer system 500. In particular embodiments, one or more computer systems 500 perform one or more steps of one or more methods described or illustrated herein (e.g., performing image comparison). In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
at time $t_2$, determining a delta set of first objects representing a difference between a first set of first objects at time $t_1$ and a second set of first objects at time $t_2$, wherein each first object is a first image, wherein the first set of first objects is represented as a first k-dimensional tree, and wherein the second set of first objects is represented as a second k-dimensional tree;
for each first object, generating n elements, $x_1 \ldots x_n$, representing the content of the first object;
comparing the delta set of first objects with a set of second objects represented as a balanced k-dimensional tree, wherein each second object is a second image;
for each second object, generating n elements, $y_1 \ldots y_n$, representing the content of the second object, wherein when comparing the content of a second object with the content of a first object, the content of the second object substantially matches the content of the first object if $$\sum_{i=1}^{n} (x_i - y_i)^2$$

is less than a pre-defined threshold; and
identifying each second object whose content substantially matches content of at least one first object from the delta set of first objects.

2. The method of claim 1, further comprising
representing the set of second objects as the balanced k-dimensional tree, comprising:
for each second object, generating k elements representing the content of the second object;
partitioning the set of second objects into the balanced k-dimensional tree based on the k elements of each second object, comprising:
for each node at each level i of the k-dimensional tree,
if a sub-set of second objects belonging to a sub-tree associated with the node has one second object, then store the one second object in the node; and
if the sub-set of second objects belonging to the sub-tree associated with the node has multiple second objects, then
sort the sub-set of second objects according to their respective (i mod k)th one of the k elements;
storing a median second object in the node;
storing any second objects to the left of the median second object in a left sub-tree of the node; and
storing any second objects to the right of the median second object in a right sub-tree of the node.

3. The method of claim 1, further comprising:
between time $t_1$ and time $t_2$, receiving one or more new first objects; and
adding the new first objects to the first set of first objects to obtain the second set of first objects.

4. One or more computer-readable non-transitory storage media embodying software that is operable when executed to:
at time $t_2$, determine a delta set of first objects representing a difference between a first set of first objects at time $t_1$ and a second set of first objects at time $t_2$, wherein each first object is a first image, wherein the first set of first objects is represented as a first k-dimensional tree, and wherein the second set of first objects is represented as a second k-dimensional tree;
for each first object, generate n elements, $x_1 \ldots x_n$, representing the content of the first object;
compare the delta set of first objects with a set of second objects represented as a balanced k-dimensional tree, wherein each second object is a second image;
for each second object, generate n elements, $y_1 \ldots y_n$, representing the content of the second object, wherein when comparing the content of a second object with the content of a first object, the content of the second object substantially matches the content of the first object if $$\sum_{i=1}^{n} (x_i - y_i)^2$$

is less than a pre-defined threshold; and
identify each second object whose content substantially matches content of at least one first object from the delta set of first objects.

5. The media of claim 4, wherein the software is further operable when executed to
represent the set of second objects as the balanced k-dimensional tree, comprising:
for each second object, generate k elements representing the content of the second object;
partition the set of second objects into the balanced k-dimensional tree based on the k elements of each second object, comprising:
for each node at each level i of the k-dimensional tree,
if a sub-set of second objects belonging to a sub-tree associated with the node has one second object, then store the one second object in the node; and
if the sub-set of second objects belonging to the sub-tree associated with the node has multiple second objects, then
sort the sub-set of second objects according to their respective (i mod k)th one of the k elements;
store a median second object in the node;
store any second objects to the left of the median second object in a left sub-tree of the node; and
store any second objects to the right of the median second object in a right sub-tree of the node.

6. The media of claim 4, wherein the software is further operable when executed to:
between time $t_1$ and time $t_2$, receive one or more new first objects; and
add the new first objects to the first set of first objects to obtain the second set of first objects.

7. A system comprising:
   one or more processors; and
   a memory coupled to the processors comprising instructions executable by the processors, the processors operable when executing the instructions to:
   at time $t_2$, determine a delta set of first objects representing a difference between a first set of first objects at time $t_1$ and a second set of first objects at time $t_2$, wherein each first object is a first image, wherein the first set of first objects is represented as a first k-dimensional tree, and wherein the second set of first objects is represented as a second k-dimensional tree;
   for each first object, generate n elements, $x_1 \ldots x_n$, representing the content of the first object;
   compare the delta set of first objects with a set of second objects represented as a balanced k-dimensional tree, wherein each second object is a second image;
   for each second object, generate n elements, $y_1 \ldots y_n$, representing the content of the second object, wherein when comparing the content of a second object with the content of a first object, the content of the second object substantially matches the content of the first object if $$\sum_{i=1}^{n} (x_i - y_i)^2$$

is less than a pre-defined threshold; and
   identify each second object whose content substantially matches content of at least one first object from the delta set of first objects.

8. The system of claim 7, wherein the processors are further operable when executing the instructions to
   represent the set of second objects as the balanced k-dimensional tree, comprising:
   for each second object, generate k elements representing the content of the second object;
   partition the set of second objects into the balanced k-dimensional tree based on the k elements of each second object, comprising:
   for each node at each level i of the k-dimensional tree,
   if a sub-set of second objects belonging to a sub-tree associated with the node has one second object, then store the one second object in the node; and
   if the sub-set of second objects belonging to the sub-tree associated with the node has multiple second objects, then
   sort the sub-set of second objects according to their respective (i mod k)th one of the k elements;
   store a median second object in the node;
   store any second objects to the left of the median second object in a left sub-tree of the node; and
   store any second objects to the right of the median second object in a right sub-tree of the node.

9. The system of claim 7, wherein the processors are further operable when executing the instructions to:
   between time $t_1$ and time $t_2$, receive one or more new first objects; and
   add the new first objects to the first set of first objects to obtain the second set of first objects.

\* \* \* \* \*